United States Patent [19]

Tanaka

[11] Patent Number: 4,991,907
[45] Date of Patent: Feb. 12, 1991

[54] AUTOMOBILE SEAT HEAD REST DEVICE

[75] Inventor: Yuji Tanaka, Kanagawa, Japan

[73] Assignee: Ikeda Bussan Co., Ltd., Ayase, Japan

[21] Appl. No.: 385,158

[22] Filed: Jul. 26, 1989

[30] Foreign Application Priority Data

Jul. 28, 1988 [JP] Japan ............................. 63-100554[U]
Jul. 28, 1988 [JP] Japan ............................. 63-100555[U]

[51] Int. Cl.⁵ .................................................. A47C 7/36
[52] U.S. Cl. ...................................... 297/408; 297/404
[58] Field of Search ................. 297/405, 408, 409, 404

[56] References Cited

U.S. PATENT DOCUMENTS 4,511,180 4/1985 Klaus ..................................... 297/408
4,840,428 6/1989 Kobayashi et al. ................... 297/403

FOREIGN PATENT DOCUMENTS 3120892 12/1982 Fed. Rep. of Germany .
3339361 5/1985 Fed. Rep. of Germany .
1592141 7/1981 United Kingdom .

Primary Examiner—Laurie K. Cranmer
Attorney, Agent, or Firm—Foley & Lardner, Schwartz, Jeffery, Schwaab, Mack, Blumenthal & Evans

[57] ABSTRACT

A head rest for the seat of an automotive vehicle is attached to a stay by means of a bolt which tightens a clamping clip onto the stay. The same bolt functions to hold the clip in place within the internal structure of the head rest. The engaging pressure of the clip can be adjusted by the bolt, and therefore, the precision with which the parts are formed does not need to be high allowing the head rest to be made inexpensively. By providing the clip in the interior of the head rest as opposed to an outside surface, it is possible to prevent injury to the vehicle occupants which might otherwise be caused by impacts on the clip or the bolt during an accident.

5 Claims, 6 Drawing Sheets

AUTOMOBILE SEAT HEAD REST DEVICE

BACKGROUND OF THE INVENTION

1. Field of the Invention

The present invention relates generally to a head rest device for an automotive vehicle wherein a head rest proper is pivotally supported on a seatback by means of a frame. More specifically the present invention relates to an improved arrangement for affixing the headrest to the frame.

2. Description of the Prior Art

An illustrative example of a conventional head rest device for employment in an automobile is the device which is disclosed in Japanese Patent Second Provisional Publication No. 57-45.

In the disclosed head rest device, two grooves each of which are triangular in cross section, are formed in opposing sections of the metal interior structure of the head rest. These grooves define a clamping support channel, generally square in cross section, in which a central section of the support stay by which the head rest is affixed to the seat is accommodated.

The support stay is gripped in the support channel which applies a given amount of surface pressure thereto for providing a desired degree of frictional resistance to relative pivotal movement of the headrest device about the axis defined by the generally horizontal central section of the support stay.

When adjustment of the inclination angle of the headrest proper becomes necessary or desirable, the headrest proper is pivotally moved against the frictional resistance provided by the engagement between the clamping support channel and the support stay.

When constructing a headrest according to the above described prior art, generally the support stay is inserted into one of the channels defined by two panels which form the semi-rigid internal structure of the head rest and thereafter the other of the two panels is welded to the first panel such that the o stay is permanently pressed between the two panels with what is hoped to be the engaging pressure that will provide the optimum degree of frictional resistance to rotation of the headrest.

In the above type of head rest, some disadvantages are encountered. One of the disadvantages of the above described prior art head rest device has to do with the difficulty, that is inherent to a structure of this sort, which one encounters when trying to provide the optimum degree of frictional resistance to relative rotation, which is to be obtained through the engagement between the channel and the central horizontal section of the stay.

This frictional resistance is provided by the resilience of the grooves defining the clamping support channel, whose shapes must be resiliently altered in order to accommodate the stay within the clamping support channel which they cooperate to define. The degree to which the dimensions of the grooves are altered determines the degree of frictional resistance which the orifices exert on the stays. Therefore, in order to consistently produce the desired degree of frictional resistance to rotation of the head rest in the prior art device, it is necessary to manufacture the clamping sections of the head rests to very strict tolerances.

This attention to the precision with which the clamping sections of the head rest units must be formed tends to add substantially to the cost of their production.

In a proposed alternative arrangement to the above-mentioned prior art head rest, the semi-rigid internal structure of a head rest device is affixed to the central horizontal section of the support stay by means of a pressure clamp which is arranged on the outer surface of the rigid internal structure. In such an arrangement, a metal clip having tabs with registered holes is placed on the central section of the stay. A bolt is passed through the registered holes in the tabs, through a hole in the bottom surface of the semi-rigid internal support member of the head rest and has a nut threaded onto an end thereof.

When the bolt is rotated with respect to the nut, in the tightening direction, the lowermost tab is urged toward the upper tab which is in engagement with the lower surface of the semi-rigid internal structure of the head rest and therefore is restricted from moving upward. As the gap between the two tabs is closed by means of the bolt, the clip is caused to tighten onto the central section of the support stay. Since the bolt passes through the hole formed in the semi-rigid support structure of the head rest, this tightening of the bolt also serves to affix the clip to the lower surface of the semi-rigid structure of the head rest. Thus, the clip or pressure clamp may be bolted onto the lower surface of the semi-rigid internal structure.

As will be appreciated from the above the stay is attached at its central section to the semi-rigid internal support structure of the head rest by means of the bolt by which the clamping pressure of the clip is applied.

In such an alternative head rest, it will be noted that the precision with which the elements forming the semi-rigid internal structure of the head rest are formed can be somewhat reduced relative to that required in the previously described prior art bead rest in which the two halves forming the semi rigid internal structure of the head rest are permanently welded together. This is because the frictional resistance of the head rest to rotation about the central horizontal section of the support stay can be adjusted by adjusting the tightness of the bolt by which the head rest is affixed to the stay.

Thus, in this head rest, it is possible to select a value of frictional resistance to rotation of the head rest about the axis of the central section of the support stay which allows the user to adjust the angle of the head rest relative to the seat back such that the head rest is in the position which provides the maximum comfort to the user.

There is a problem however in the above proposed head rest, in connection with the fact that the head rest is affixed at its lower surface to the stay. Adjustment of the head rest causes it to pivot about the axis of the central section of the support stay. Since the support stay is arranged at the bottom of the head rest, it is impossible to adjust the angle of the head rest without causing main portion of the head rest to come forward of the general plane of the seat back to an uncomfortable degree, or to pivot backwards to a point where the head rest no longer supports the head of the vehicular seat's occupant.

As is well known to those skilled in the art, it is the purpose of the head rest to help to prevent injury to the head and neck of the vehicular seat occupant by preventing the occupant's head from swinging suddenly and violently backwards relative to the occupants body, resulting in the type of injury known as whiplash. In view of this, another problem exists in that, if the resistance to frictional rotation of the latter described head rest is adjusted, by means of the bolt, to a value which allows reasonably easy angular adjustment of the head rest by the user, in the event of vehicular traffic accident, such as a rear end collision, the forces applied by the occupant's head to the head rest easily cause it to pivot backward and thus it becomes practically useless as far as the enhancement of the vehicular seat occupant's safety is concerned. What is more, when the head rest pivots backwards under the impact of the occupant's head, the head or the shaft, of the bolt by which the head rest is fastened to the stay is caused to face in the direction of the back of the occupant's head and could perforate the occupants skin and, if the force of the impact is great, may crack the occupant's skull or spine.

The same concern would hold true for the occupant of the rear seat of the vehicle whose head would come into violent contact with the rear side of the head rest in the event of a head on collision causing it to pivot forward and expose the bolt on the bottom thereof to the rear seat occupant's face.

The problems of the head rest pivoting backwardly under impact of the occupant's head may be overcome in a variant on the above arrangement in which the clip, by which the seat back head rest is attached to the horizontal middle section of the support stay, is positioned on an inner surface of the semi-rigid internal structure of the head rest.

In this manner, the head rest supporting clip can be arranged at a point in the head rest that is rear the vertical center thereof. Therefore when the head of the occupant comes into contact with the head rest under the pressure of impact the direction of the pressure is essentially on the pivoting axis of the head rest on the stay and therefore the head rest is under no particularly strong impetus to rotate about the support stay.

Unfortunately in the latter arrangement of the head rest, the safety of the head rest is not particularly improved. This is due in part to the fact that normally, in order to cushion the blow to the seat occupant's head in the event of a rear end accident, it is desirable that the inner structure of the head rest is somewhat resilient so that the inner structure absorbs some of the impact which would otherwise be transmitted from the vehicle body to the seat back and from the seat back to the seat occupant's head by means of the support stay and the head rest. In the latter proposed head rest above however, the clip by which the head rest is attached to the stay is provided at the central section of the head rest and therefore the support stay is essentially aligned with the back of the occupants head. Thus, the resilience of the internal structure of the head rest cannot be advantageously used to protect the occupant's head from contact with the horizontal section of the support stay. Therefore, the only effective cushioning resilience that can be provided is that provided by the layer of resiliently cushioning material on the front surface of the head rest. This cushioning material must, of course, be somewhat soft and resilient so that when the occupants head impacts the head rest, the layer of cushioning material becomes resiliently compressed so as to cushion the occupants head from violent contact with the rigid support structure of the head rest.

Unfortunately in the above arrangement, if the cushioning material is appropriately soft to adequately cushion the occupant's head in the event of a rear impact to the vehicle, then when it is compressed during impact with the occupants head the problem is again encountered that the occupant's head comes into forcible contact with either the support stay or the head or the shaft of the bolt by which the head rest is attached, via the clip, to the support stay, since the bolt and the stay are buried in the padding material at the front side of the head rest. This again places the seat occupant in danger of injury due to forcible contact with the head of the bolt by which the head rest is attached to the stay.

BRIEF SUMMARY OF THE INVENTION

In view of the above problems, it is one goal of the present invention to provide an adjustable head rest for an automotive vehicle by which the general safety of the vehicular occupants, and in particular that of the occupant riding on the seat on which the head rest is provided, is improved.

It is another object of the present invention to provide an improved adjustable head rest for a vehicular seat which is easy to manufacture and is therefore inexpensive to produce.

It is another object of the present invention to provide an improved adjustable head rest for a vehicular seat in which the amount of frictional resistance to rotation thereof, about the support stay by which the head rest is attached to the vehicular seat, can be easily adjusted to an optimum value at the time of assembly.

It is yet another object of the present invention to provide an improved adjustable head rest for a vehicular seat in which the internal support structure has an appropriate degree of resilience for resiliently absorbing shock such as would be applied thereto by the head of the vehicular occupant in the event of a rear end collision to the vehicle in which the head rest is provided.

It is still another object of the present invention to provide an improved adjustable head rest for a vehicular seat wherein a clip by which the support stay for attaching the head rest to the seat of the vehicle can be conveniently attached to the stay as a pre-assembly so as to facilitate the easy assembly of the head rest.

It is still another object of the present invention to provide an improved adjustable head rest for a vehicular seat in which the horizontal section of the support stay, the clip through which $ horizontal section of the support stay is attached to the internal semi-rigid structure of the seat back, and the fastener by which the clip is attached to the head rest is attached to the internal structure of the head rest are all received on or within the head rest's semi-rigid internal structure in such a manner as not to protrude significantly beyond planes defined by the general planes of the flat outer surfaces of the semi-rigid internal structure of the head rest and therefore do not pose a threat to the heads of any of the vehicular occupants in the event of a vehicular accident.

According to one aspect of the present invention, the above objects are achieved by providing a head rest wherein an inner support member is pivotally supported on a stay attached to a seatback, by a resilient clip means of generally U-shaped cross section, which has a channel portion in which the stay is received and an open portion facing a given direction defined by a pair of parallel flange portions which extend from the channel portion.

The resilient clip is mounted to the inner support member in such a manner that the clearance between the flange portions is adjustable for adjusting the gripping force of the resilient clip means on the stay.

According to another aspect of the invention, there is provided, in a headrest device wherein an inner support member is pivotally supported by a seatback through a stay, a connector clip formed of a resilient material and generally U-shaped in cross section has the stay received in a gripping channel portion thereof, the stay comprising a pair of parallel flange portions extending from the channel in a given direction.

An opening, through which the stay is inserted, is formed at either the front face portion or the rear face portion of the inner support member, and one of the flange portions of the connector clip bracket engages with an inside portion of a bottom surface portion of the inner support member, for attaching the stay received in the channel portion to the inner member, and the clearance between the flange portions can be adjusted for adjusting the gripping force of the connector clip on the stay.

According to still another aspect of the present invention, in a seat head rest having an internal support means for defining a semi-rigid impact absorbent internal support structure of the head rest, a stay is provided for supporting the head rest on a seat frame and a connector for defining a connection between the internal support structure and the stay which connection provides an adjustable degree of frictional resistance to rotation of the internal support structure about an axis defined by a section of the stay.

The connector may be defined by a resilient clip whose inner diameter is less than the outer diameter of the portion of the stay on which the clip is fitted when the clip is in an undistorted state.

A bolt may be non-rotatably mounted on a surface of the semi-rigid impact absorbent internal structure so as to have a threaded portion thereof projected inwardly into the interior portion of the internal structure for being received in a hole formed in a flange defined on the clip for attaching the clip to the semi-rigid internal structure.

Preferably, the head of the bolt is received in a recess in the semi-rigid internal structure so as o not to protrude from the outer surface of the semi-rigid internal structure.

The bolt receives a nut on a threaded end portion thereof, which is operable for adjusting the clamping pressure of a pressure clip.

A bead may be formed at a side of the channel opposite that from which the flanges protrude for allowing the channel of the clip to be elastically spread open. A lip which protrudes downwardly at an end portion of one of the flanges may be provided for engaging the other one of said flanges.

DETAILED DESCRIPTION OF THE PREFERRED EMBODIMENTS

Figure 1:
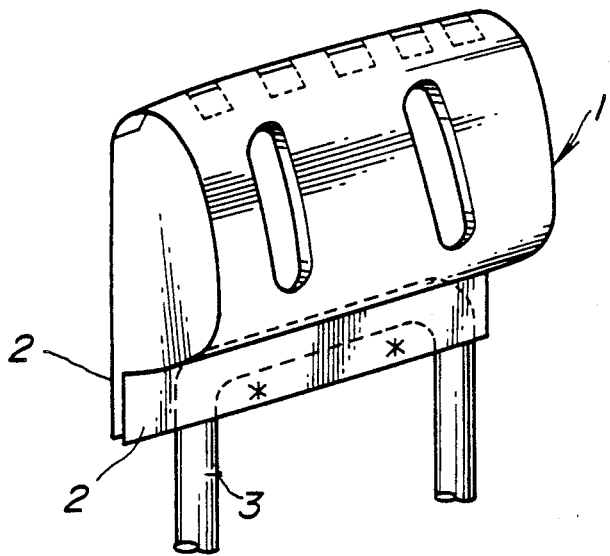
FIG. 1 is a front three quarter perspective view of the internal structure and support stay of a prior art head.

Referring now to FIG. 1, a prior art head rest is shown for comparison purposes in order to facilitate better understanding of the advantages of the device according to the present invention. In an internal structure 1 of the head rest according to the prior art arrangement shown in FIG. 1, two grooves (not clearly shown), each of which are triangular in cross section, are formed in opposing sections of the metal interior structure of the head rest. These grooves define a clamping support channel, that is generally square in cross section, in which a central section of a support stay 3, by which the head rest is affixed to the seat, is accommodated.

The support stay 3 is received in the channel in one of plates 2 while the other plate is held over the stay under pressure and welded to the first plate 2. Thus, the two plates apply a given amount of surface pressure to the stay for providing what is hoped to be the desired degree of frictional resistance to relative pivotal movement of the headrest device about the axis defined by the generally horizontal central section of the support stay 3.

As has been mentioned above, when adjustment of the inclination angle of the headrest becomes necessary or desirable, the head rest is pivotally moved against the frictional resistance provided by the engagement between the clamping support channel and the support stay 3.

As has been noted, the type of head rest shown in FIG. 1 has some disadvantages. For example, since the panels 2 are welded permanently, it is difficult to consistently provide the optimum degree of frictional resistance to relative rotation, which is obtained through the engagement between the plates and the stay 3 in every unit produced.

This is because the frictional resistance is provided by the resilience of the grooves defining the clamping support channel, whose shapes must be resiliently altered in order to accommodate the stays with the clamping support channel The degree to which the dimensions of the grooves are altered determines the degree of frictional resistance which the orifices exert on the stays. Therefore, in order to consistently produce the desired degree of frictional resistance to rotation of the head rest in the prior art device it is necessary to manufacture the clamping sections of the head rest to very strict tolerances.

This attention to the precision with which the clamping sections of the head rest units must be formed tends to add substantially to the cost of their production.

Figure 2:
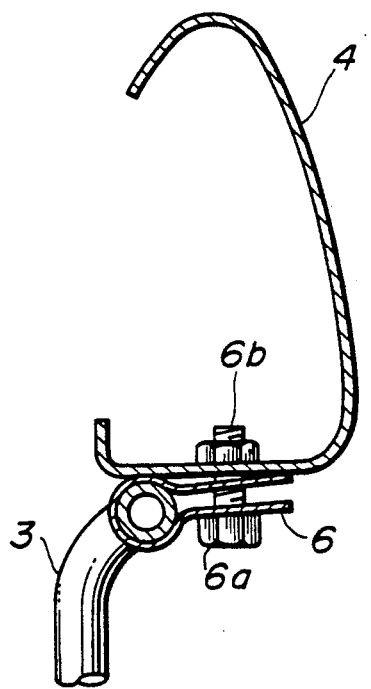
FIG. 2 is a cutaway side elevational view of the internal semi-rigid structure and connecting clip of another prior art head rest.

In a head rest device shown in FIG. 2 proposed to overcome the disadvantages of the above device, a semi-rigid internal structure 4 of the head rest device is affixed to the central section of the support stay 3 by means of a metal clip 6 which is arranged on the bottom outer surface of the rigid internal structure 4. In such an arrangement, the metal clip 6 having tabs with registered holes is placed on the central section of the stay. A bolt 6a is passed through the registered holes in the tabs, through a hole in the bottom surface of the semi-rigid internal support member of the head rest, and has a nut 6b threaded onto an inner end thereof.

When the bolt 6a is rotated with respect to the nut 6b, in the tightening direction, the lowermost tab is urged toward the upper tab which is in engagement with the lower surface of the semi-rigid internal structure 4 of the head rest and therefore is restricted from moving upward. As the gap between the two tabs is closed by means of the bolt 6a, the clip 6 is caused to tighten onto the central section of the stay member 3. Since the bolt 6a passes through the hole formed in the semi-rigid internal structure 4 of the head rest, this tightening of the bolt also serves to affix the clip 6 to the lower surface of the semi-rigid internal structure of the head rest. Thus the clip 6 serves to bolt the stay 3 onto the lower surface of the semi-rigid internal structure 4.

In the FIG. 2 device, it will be noted that the precision with which the elements forming the semi-rigid internal structure of the head rest are formed can be reduced relative to that required in the prior art head rest of FIG. 1. This is because the frictional resistance of the head rest to rotation about the central portion of the stay can be adjusted by adjusting the tightness of the bolt 6a by which the head rest is affixed to the stay.

There is a problem however in the FIG. 2 device in that the inner structure 4 of the head rest is affixed at its lower surface to the stay 3. Because the head rest is affixed at its lower surface to the stay 3, adjustment of the head rest causes it to pivot about the axis of the central section of the support stay 3. Since the support stay 3 is arranged at the bottom of the head rest, it is impossible to adjust the angle of the head rest without causing the main portion of the head rest to come forward of the general plane of the seat back to an uncomfortable o degree, or to pivot backwards to a point where the head rest no longer supports the head of the vehicular seat's occupant.

Another problem exists in that, as can be appreciated from consideration of FIG. 2, if the resistance to frictional rotation of the latter described head rest is adjusted, by means of the bolt 6a, to a value which allows reasonably easy angular adjustment of the head rest by the user, in the event of vehicular traffic accident such as a rear end collision, the forces applied by the occupants head to the head rest easily cause it to pivot backward enhancement of the vehicular seat occupant's safety is concerned.

Furthermore if the head rest is caused to pivot forwards under the impact of the rear seat occupant's head in a front end or head on collision, the head or the shaft, of the bolt 6a by which the head rest is fastened to the stay 3 is caused to face in the direction of the rear seat occupants face and can perforate the rear seat occupants skin or damage the rear seat occupant's eyes and if the force of the impact is great may cause severe damage to the rear seat occupant's facial bone structure.

Figure 3:
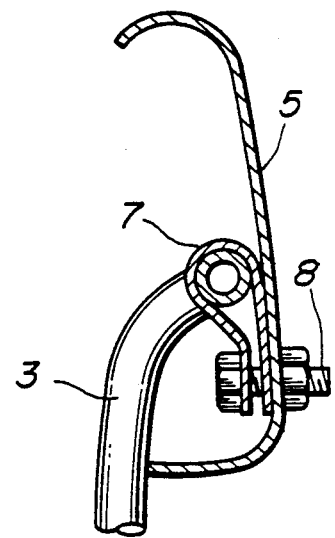
FIG. 3 is a cutaway side elevational view of the internal semi-rigid structure and connecting still another prior art head rest.

In still another prior art head rest device shown in FIG. 3, the problem of the head rest pivoting backwardly under impact of the occupant's head is overcome by placing the clip 7, by which the head rest is attached to the horizontal middle section of the support stay 3, at a point in an inner surface of the semi-rigid internal structure 5 of the head rest that is near the vertical center thereof. Therefore, when the head of the occupant comes into contact with the head rest under the pressure of impact, the direction of the pressure is essentially perpendicular to the pivoting axis of the head rest on the stay 3 and therefore head rest is under no particularly strong impetus to rotate about the support stay.

Unfortunately as has been noted, the safety of the FIG. 3 device is not particularly improved over the above-mentioned prior art devices. This is due in part to the fact that the clip by which the head rest is attached to the stay is provided at the central section of the head rest and therefore the support stay 3 is essentially aligned with the back of the occupants head and resilience of the inner structure 5 of the head rest does not help cushioning the occupants head from impact on the central section of the stay. This is because any resilience of the internal structure 5 of the head rest will simply allow the occupant's head to come into closer contact with the horizontal section of the stay 3.

Therefore, the only way that any effective cushioning resilience can be provided is by the layer of resilient cushioning material (not shown) on the front surface of the semi-rigid internal structure 5. Unfortunately, if the cushioning material is appropriately soft, so as to adequately cushion the occupant's head in the event of a rear impact to the vehicle, then when it is compressed during impact with the occupant's head the problem again is encountered that as the padding is compressed the occupant's head comes into contact with the horizontal section of the stay.

What is more, as has been noted above if the vehicle is involved in a front end or head on collision the forehead or face of the rear seat occupant is highly likely to come into violent contact with the rear face of the head rest and may be severely damaged by the shaft of the bolt 8 by which the head rest's semi-rigid internal structure 5 is attached, via the clip 7, to the support stay 3, since the bolt 8 is buried in the padding material (not shown) at the front side of the clip.

This again places the rear seat occupant in danger of having his or her skin perforated and or having his or her skull cracked by forcible contact with the head of the bolt 8 which protrudes at the rear of the head rest.

Figure 4:
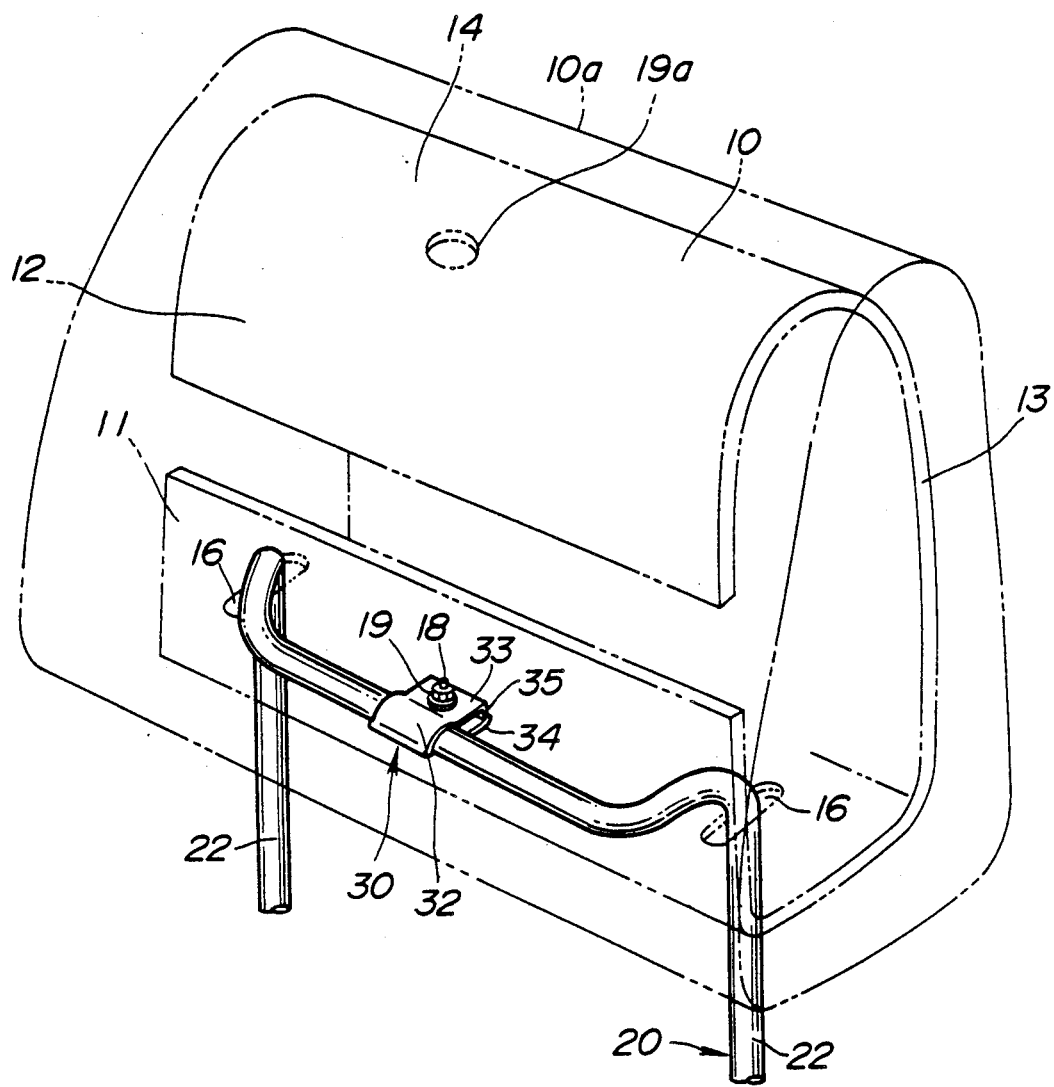
FIG. 4 is a three quarter perspective view of essential parts including a connecting mechanism for an adjustable head rest according to the present invention, wherein a support stay, a connecting clip, and a connector bolt are shown in solid lines and a semi-rigid internal structure and an outer cushioning of the head rest are indicated in phantom chain lines.
Figure 5:
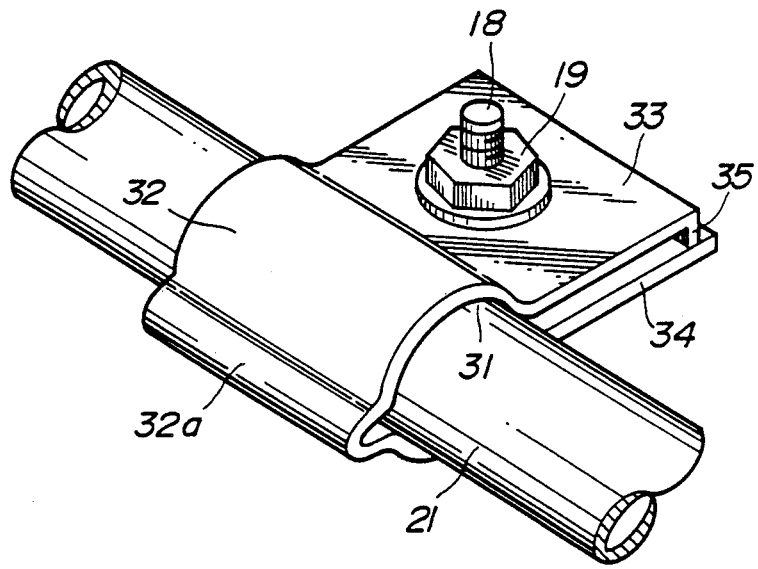
FIG. 5 is an enlarged three quarter perspective partial view of the horizontal section of the support stay on which the connector clip and the connector clip bolt are attached.
Figure 6:
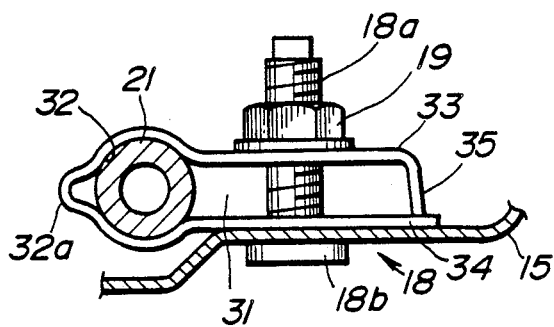
FIG. 6 is an enlarged side elevation cutaway view showing a section of the internal structure of the adjustable head rest on which the connector clip for attaching the head rest to the horizontal section of the support stay is connected by means of the connector bolt.

Referring now to FIG. 4, FIG. 5 and FIG. 6, a first preferred embodiment of the adjustable head rest according to the present invention is depicted.

The adjustable head rest according to the preferred embodiment of the present invention is, as were the previously described head rests, supported on the seat back (not shown) by means of a support stay 20. The support stay 20 may be formed of any material that is appropriately strong. In the present embodiment, the stay 20 is formed of metal tubing.

A connector clip or pressure clamp 30, which will be described in further detail later, is provided for forming an adjustable connection between the internal semi-rigid structure 10 of the head rest and the support stay 20.

The connector clip 30 is attached to the internal semi-rigid structure 10 of the head rest by means of a bolt 18 which has a threaded shaft portion 18a extending substantially vertically into the head rest (as shown in FIG. 4), and on which a nut 19 is provided for applying pressure to an upper tab portion 33 of the clip 30.

The connector clip 30 is attached to the inner bottom surface 15 of the semi-rigid internal structure 10.

Elongate holes 16 are formed in the bottom surface of the semi-rigid internal structure 10 of the head rest. The stay 20 is arranged such that its downwardly protruding leg portions 22 protrude through the holes 16 and out of the bottom of the head rest.

The stay 20 is formed in the general shape of an inverted U and the central section 1 thereof runs substantially horizontally in the direction that is essentially parallel to the front planar surface of the vehicular seat (not shown).

The semi-rigid internal structure 10 is roughly in the shape of a flattened C. The C-shape of the semi-rigid internal structure is defined by the bottom surface 15 on which the clip 30 for attaching the head rest to the central section 21 of the stay 20 is provided, a rear face portion 13, an upper radius section 14 and a downwardly protruding lip portion 12 the lower edge of which defines the upper edge of a gap and the lower edge of which gap is defined by an upper edge of an upwardly protruding lip 11. The semi-rigid internal structure 10 may be formed of, for example, sheet metal which may be tempered after being stamped into the desired shape so as to give it the desired resilience.

The upper lip 12 and the lower lip 11 are flexible so that they absorb pressure applied to the head rest by the seat occupant's head in the event of a rear end collision. The width of the gap defined by the upper and lower edges determines in part the degree of rigidity that the front portion of the semi rigid internal structure 10 of the head rest has, in resiliently absorbing the impact of the seat occupant's head thereon. Thus the gap between the upper lip 12 and the lower lip 11 serves to determine the degree of effective flexibility of the head rest.

In order to allow tool access to the nut 19 of the bolt 18 an access hole 19a is formed in the radius portion 14 of the semi-rigid structure of the head rest. The hole 19a serves to allow a tool such as a socket equipped with a shaft to be inserted therethrough such that it may be fitted over the nut 19. It will be noted that without this hole 19a for access to the nut 19 it would be exceedingly difficult to attach and adjust the clip 30.

As seen in the enlarged partial perspective view of the horizontal section 21 of the support stay 20, and connector clip 30, and in the enlarged partial side elevation view shown in FIG. 6, in the preferred embodiment, the upper tab 33 of the clip 30 comprises a lip 35 which protrudes downwardly so as to engage the upper surface of the lower tab 34. In this manner, the section of the tab 33 between the downwardly protruding lip 35 and the channel section 32 in which the horizontal portion 21 of the support stay 20 is received is maintained in a state wherein a gap exists between it and the upper surface of the lower tab 34. Thus, when the nut 19 is rotated in the tightening direction on the shaft section 18a of the bolt 18, it can be assured that the pressure will increase on the horizontal section 21 of the stay 20.

The clip 30 comprises a bead 32a formed at the front side portion of the clamping channel 32. The purpose of this bead 32a is to assure that tightening of the nut 19 onto the shaft 18a of the bolt 18 provides a smoothly adjustable increase in the clamping pressure of the clip 30 onto the central horizontal portion 21 of the stay 20.

The bolt 18 is preferably secured at its head 18b to the lower surface 15 of the semi-rigid internal structure 10 such that the shaft 18a of the bolt 18 protrudes upwardly within the semi-rigid internal structure 10.

When assembling the support structure of the head rest, including the support stay 20, connector clip 30 and the semi-rigid internal structure 10, the connector clip is first placed at the desired position on the central section 21 of the support stay 20. Preferably the diameter of the internal channel 32 of the connector clip is slightly less than the outer diameter of the central portion 21 of the stay 20. Thus, thanks to the inherent resilience of the connector clip 30, it is maintained on the central section 21 of the stay at the desired position and orientation. Thereafter the support stay is inserted into the interior of the semi-rigid internal structure 10.

Once the central section 21 of the stay 20 is received within the interior of the semi-rigid internal structure 10 with the legs 22 protruding though the holes 16 formed in the bottom of the internal structure 10, the registered holes of the clip are fitted over the shank 18a of the bolt. Thereafter, the nut 19 is threaded onto the shaft 18a of the bolt 18 and is tightened by means of a socket wrench inserted through the access hole 19a in the top 14 of the internal structure 10 so as to attach the stay 20 to the semi-rigid structure 10 via the connector clip 30. The frictional resistance to rotation of the head rest about the central portion 21 of the stay 20 can be thereafter adjusted by means of the nut 19.

Thus, it can be seen that the support structure of the head rest according to the first preferred embodiment can easily and quickly be assembled.

It will be noted that the head 18b of the bolt 18 by which the clip 30 is attached to the head rest is selected to be of a type having a low profile so as not to protrude significantly from the lower side 15 of the semi-rigid internal structure 10. In this manner the hazard to the occupants of the rear seat posed by the protruding head of the bolt is rendered practically nonexistent. This is made possible in part by the fact that the nut is tightened onto the bolt which is preferably formed so as to remain stationary on the lower surface 15 of the semi-rigid internal structure 10.

Thus it may be appreciated from the above that the first preferred embodiment of a head rest according to the present invention overcomes the safety problems inherent in the prior art head rests.

One problem overcome by the above embodiment is that, since the clamping pressure of the connector clip 30 can be easily adjusted at the time of assembly of the head rest with the stay 20, the requirement found in the prior art head rest that the stay receiving channel must be formed with extreme precision, in order to assure the desired degree of clamping pressure and resulting frictional resistance to rotation of the head rest about the horizontal section of the support stay, no longer exists Another problem found in the prior art device which is greatly diminished by the head rest according to the first preferred embodiment of the invention is that of the location within the head rest of the horizontal section of the support stay. As can be appreciated from a consideration of the above, the pivoting axis of the head rest about the horizontal section of the stay is moved upward from a position beneath the bottom surface of the semi-rigid internal structure thereof in the prior art head rests and, to a point within the semi-rigid internal structure of the head rest that is nearer the middle section thereof at which the seat occupant's head could be expected to apply pressure in a rear end type accident therefore giving the occupant's head and neck better support.

Figure 7:
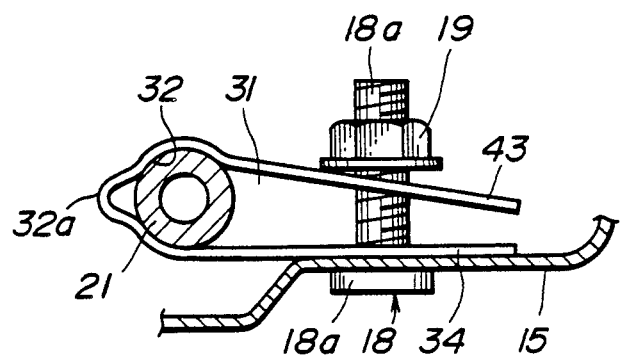
FIG. 7 is a view similar to FIG. 6, but showing a modification of the first embodiment.

In FIG. 7, a modification of the pressure clip is shown. The clip is different from that depicted in FIG. 6 only in that the downwardly protruding lip is omitted from upper tab 43 so as to facilitate easier and cheaper construction of the clip.

Figure 8:
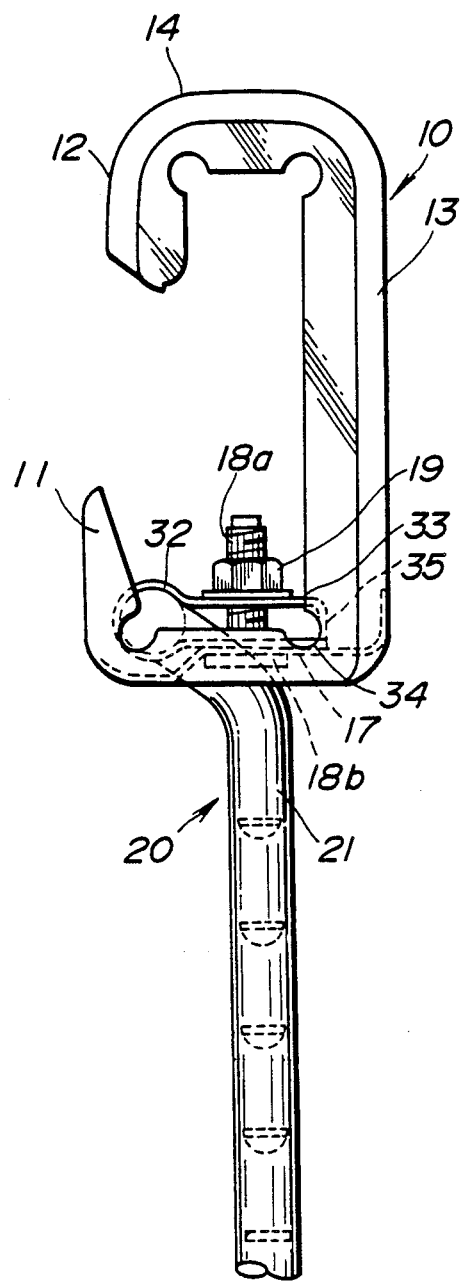
FIG. 8 is a side elevational view of a second preferred embodiment of an adjustable head rest according to the invention wherein a padding of the head rest has been omitted in order to provide a clearer view essential parts.
Figure 9:
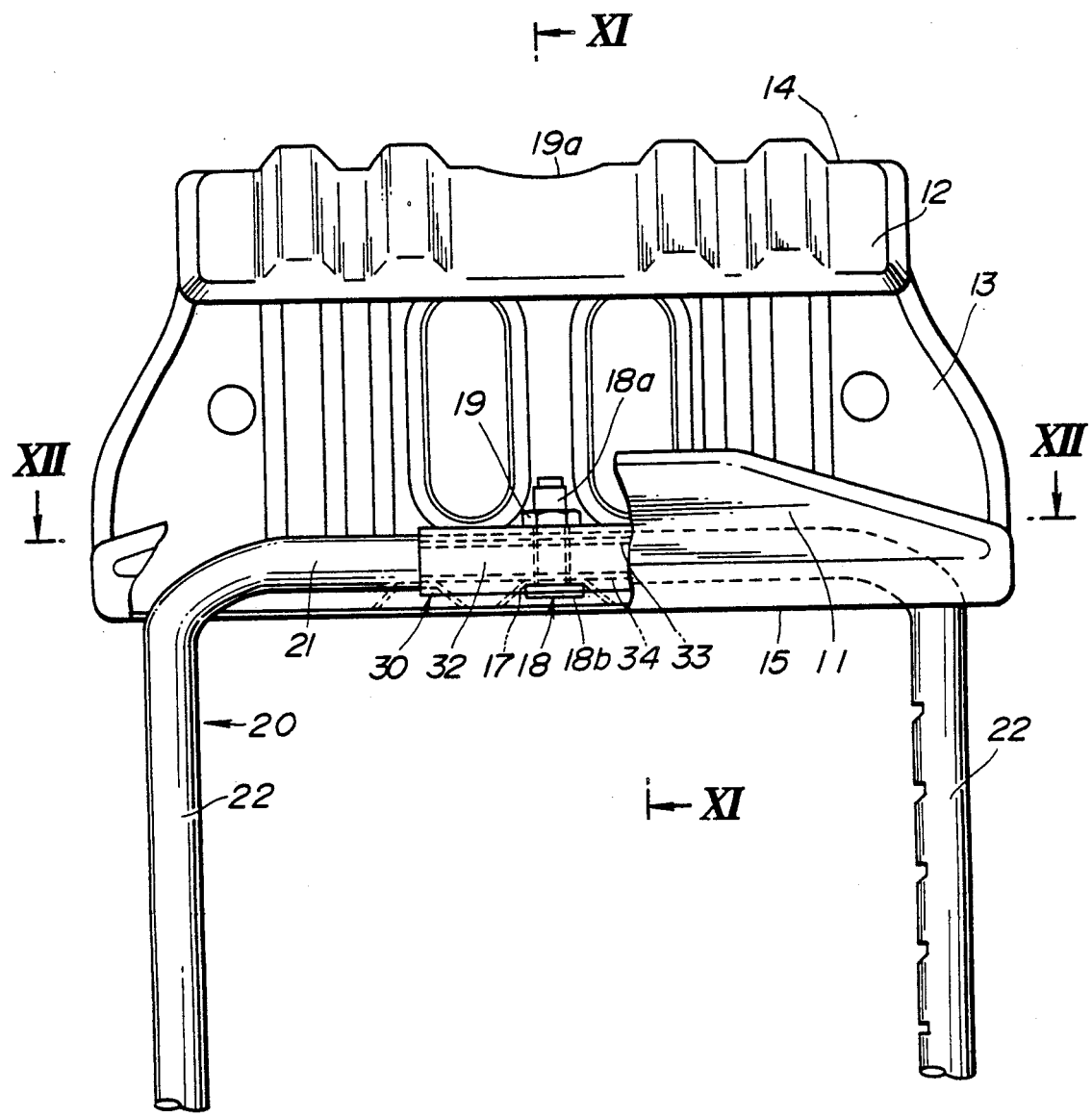
FIG. 9 is a front elevational view of the second preferred embodiment of an adjustable head rest according to the invention wherein the padding of the head rest has been omitted.
Figure 10:
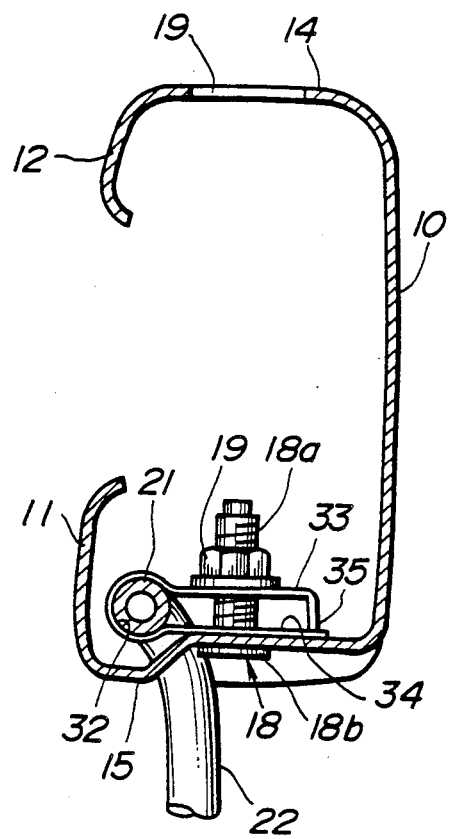
FIG. 10 is a cutaway side elevational view of the second preferred embodiment of an adjustable head rest according to the invention wherein the padding of the head has been omitted for a clearer view of the essential parts of the second embodiment.

In FIGS. 8, 9, and 10, a second preferred embodiment of a head rest according to the present invention is depicted. In order to avoid confusion of members in the second embodiment shown in FIGS. 8, 9, 10, and 11 whose functions are basically similar or identical to those of the first preferred o embodiment shall be referred to using the same reference numerals as their corresponding parts in the parts in the first preferred embodiment.

Referring now to FIG. 8, the second embodiment of a head rest of the invention is shown in a side elevation view wherein the head rest is depicted without the padding so as to provide simpler clearer drawing. As can be seen from FIG. 8, the connector clip 30 of the second preferred embodiment is similar to that of the first preferred embodiment in every respect except for the fact that the connector clip of the second embodiment lacks the bead section 32a formed at the front of the connector clip of the first embodiment.

It will further be noted that the semi-rigid internal structure 10 of the head rest of the second embodiment is essentially similar in overall form to that of the first preferred embodiment. The semi-rigid internal structure 10 varies from that shown in the first embodiment in that it is formed with ridges and flanges designed to enhance its stiffness. Thus the semi-rigid internal structure 10 may be formed of a lighter material while still providing the same degree of stiffness as the semi-rigid internal structure shown in the first embodiment. For example, whereas the semi-rigid internal structure of the first preferred embodiment was disclosed as being formed of sheet metal of a given thickness which produces the desired degree of stiffness, it is possible, with the rib structure as shown, to use a thinner gauge of sheet metal to produce an internal structure having the same stiffness. What is more it will be noted that the semi-rigid internal structure of the seat back may be formed of a non-metal substance such as plastic or resin impregnated fiber glass.

Another effect of the rib structure of the head rest is that the anchoring point of the clip 30 becomes still higher within the internal structure 10 of the head rest. One effect of this raising of the anchoring point is that the pivoting axis of the head rest about the central section 21 of the stay 20 is raised so that it is nearer the center of the head rest, thus further reducing the tendency of the head rest to rotate about the axis of the center portion 21 of the stay 20 under the impact of the seat occupant's head in the case of a rear end accident Still another feature of the rib structure, which can be appreciated best from a consideration of FIG. 9, is that the head 18b of the bolt 18 by which the connector clip 30 is attached to the ribbed floor 15 of the semi-rigid inner structure 10 is located within a recess 17 in the bottom of the head rest so that it does not protrude at all from the bottom of the head rest and therefore does not pose a hazard to the passengers on the rear seat in the event of a head-on collision.

As can be seen from FIG. 10, a portion of the floor 15 of the semi-rigid internal structure 10 in front of the ribbed portion thereof is not ribbed so as to accommodate the channel portion 32 of the connector clip 30.

Figure 11:
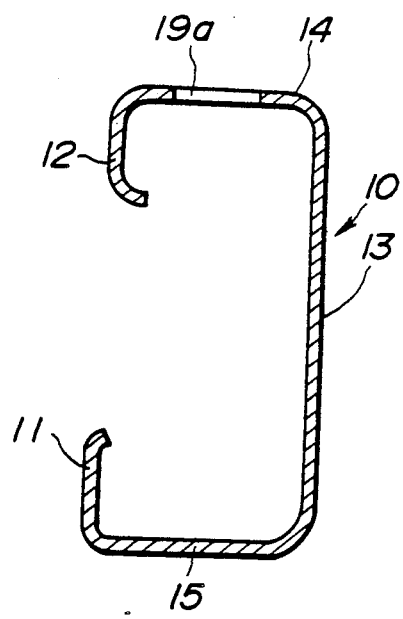
FIG. 11 is a cutaway side elevational view of the semi-rigid internal member of the second preferred embodiment, which is taken along the line XI—XI indicated in FIG. 9.

In FIG. 11, a vertical cross section of the head rest is shown taken along the line XI—XI of FIG. 9 so as to include one of the rib portions thereof. It will be appreciated therefrom that the silhouette of the head rest is generally rectangular as defined by the ribs thereof.

Figure 12:
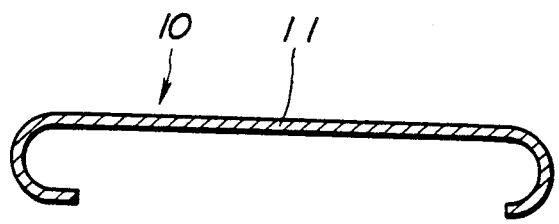
FIG. 12 is a cutaway plan view of the front lip section of the embodiment of the internal semi-rigid structure of the head rest shown in FIG. 9, which is taken along the line XII—XII indicated in FIG. 9.

FIG. 12 is a horizontal cross sectional view taken along the horizontal line XII—XII bisecting the front lip portion 11 of the internal structure 10 of the head rest. As can be appreciated, the side edges of the semi-rigid internal structure 10 according to the second preferred embodiment of the invention are rolled inward such that no sharp edges exist which might cut through the padding which covers the head rest in the event of an impact to the side thereof in an accident. Thus the safety of the head rest is improved.

It will be noted that in the above first and second preferred embodiments of head rest it is possible to form the connector clip and stay as a pre-assembly which may be inserted through the gap defined between the upper lip 12 and the lower lip 11 of the semi-rigid internal structure 10 of the head rest. When the horizontal section 21 of the stay 20 is received within the interior of the semi-rigid internal structure of the head rest, the legs 22 project downwardly through holes 16 formed in the bottom 15 of the internal structure 10 of the head rest. Once the central portion 21 of the stay 20 is positioned within the head rest at the desired position, the clip may be attached by means of a bolt 18 onto which a nut 19 is tightened by a tool which can be inserted through an access hole which 19a is conveniently provided at the top 14 of the semi-rigid inner structure of the head rest. Thus the assembly of the head rest according to the preferred embodiments of the invention can be quickly and easily accomplished so as to realize significant savings to the manufacturer as well as the above disclosed safety improvements.

What is claimed is:

1. A head rest device for use with a seatback, comprising:
    a support stay extending from said seatback, said support stay having a straight section which lies substantially horizontally when said support stay is properly connected to said seatback;

an inner support member which is pivotally supported by said support stay in the vicinity of said straight section;

an outer cushioning member disposed about said inner support member;

a resilient clip of generally U-shaped cross section, said clip including a channel portion in which said straight section of said support stay is received, and an open portion defined by a pair of parallel flange portions which extend from said channel portion;

a lip member which extends from a leading end of one of said parallel flange portions toward a leading end of the other flange portion;

connection means for connecting said clip to said inner support member, said connecting means being capable of adjusting the clearance between major portions of said flange portions and thus adjusting the gripping force of the clip on said straight section.

2. A head rest having an internal support means for defining a semi-rigid impact absorbent internal support structure of said head rest, comprising:

stay means extending into said internal support structure for supporting said head rest on a seat;

connecting means for defining a connection between said internal support structure and said stay means, said connection providing an adjustable degree of frictional resistance to rotation of said internal support structure about an axis defined by a section of said stay means;

wherein said connector means is defined by a clip comprised of a channel portion for receiving a portion of said stay means, a pair of substantially parallel flanges protruding from said channel portion, a pair of registered holes formed in said flanges for receiving a bolt extending substantially vertical into said internal support structure, a bead formed at a side of the channel opposite to that from which said flanges protrude for allowing said channel of said clip to be elastically open, and a lip protruding downwardly at an end portion of one of said flanges for engaging the other one of said flanges.

3. A head rest as set forth in claim 2, wherein a head of said bolt is received in a recess in said semi-rigid internal structure so as not to protrude from an outer surface of said semi-rigid internal structure.

4. A head rest as set forth in claim 2, wherein said bolt receives a nut on a threaded end portion thereof, said nut being operatable for adjusting the clamping pressure of said clip.

5. A head rest as set forth in claim 2, wherein said clip is designed such that said flanges define a space of a thickness which, in an undistorted condition, is less than the diameter of said portion of said stay means.

* * * * *